US012648665B2

(12) United States Patent
Kinnear et al.

(10) Patent No.: US 12,648,665 B2
(45) Date of Patent: Jun. 9, 2026

(54) COMPACT COFFEE PRESS

(71) Applicant: CENTRAL UNIVERSITY OF TECHNOLOGY, FREE STATE, Bloemfontein (ZA)

(72) Inventors: William Allan Kinnear, Bloemfontein (ZA); George Hugo, Bloemfontein (ZA); Altus Van Heerden, Bloemfontein (ZA)

(*) Notice: Subject to any disclaimer, the term of this patent is extended or adjusted under 35 U.S.C. 154(b) by 310 days.

(21) Appl. No.: 18/681,848

(22) PCT Filed: Jul. 29, 2022

(86) PCT No.: PCT/IB2022/057076
§ 371 (c)(1),
(2) Date: Feb. 6, 2024

(87) PCT Pub. No.: WO2023/012629
PCT Pub. Date: Feb. 9, 2023

(65) Prior Publication Data
US 2024/0335059 A1 Oct. 10, 2024

(30) Foreign Application Priority Data
Aug. 6, 2021 (ZA) ................................. 2021/05534

(51) Int. Cl.
A47J 31/20 (2006.01)
A23F 5/26 (2006.01)
(Continued)

(52) U.S. Cl.
CPC ................. *A47J 31/20* (2013.01); *A23F 5/26* (2013.01); *A47J 31/005* (2013.01); *A47J 31/0626* (2013.01)

(58) Field of Classification Search
CPC ...... A47J 31/20; A47J 31/005; A47J 31/0626; A47J 31/32; A47J 31/02; A47J 31/0615;
(Continued)

(56) References Cited

U.S. PATENT DOCUMENTS

2015/0366395 A1* 12/2015 Do ....................... A47J 31/0615
99/323
2018/0352993 A1* 12/2018 Yoon ....................... A47J 31/18

OTHER PUBLICATIONS

Palmpress Coffee Press Instructions / How to Brew, Good Coffee Vibes YouTube video uploaded Aug. 19, 2020. url: https://www.youtube.com/watch?v=3gmWqZCxc0c (Year: 2020).*
(Continued)

*Primary Examiner* — Erik Kashnikow
*Assistant Examiner* — Luis Eugenio Diou Berdecaia
(74) *Attorney, Agent, or Firm* — Andrew D. Bochner; Bochner PLLC

(57) ABSTRACT

The invention relates to a compact coffee press comprising plunger member, a soft, flexible diaphragm, and a receptacle member comprising an outlet, wherein the diaphragm is reversibly displaceable between a first position where the plunger member is elevated above the diaphragm, and a second position where the plunger member is depressed and the diaphragm is inverted, the plunger member fitting substantially within the diaphragm, and the diaphragm fitting substantially within the receptacle member. The invention further relates to a method of brewing and extracting coffee with the use of the compact coffee press.

19 Claims, 2 Drawing Sheets

(51) Int. Cl.
  *A47J 31/00*          (2006.01)
  *A47J 31/06*          (2006.01)
(58) Field of Classification Search
  CPC ................ A47J 31/3671; A47J 31/4403; A47J
                31/4457; A47J 2203/00; A23F 5/26
  USPC ........................................... 426/433; 99/323
  See application file for complete search history.

(56)                References Cited

OTHER PUBLICATIONS

Palmpress, Christopher Kimball's Milk Street, YouTube video uploaded Mar. 25, 2021 url: https://www.youtube.com/watch?v=Y2DCK0E6BpQ (Year: 2021).*

* cited by examiner

10

38

24

10

38

14/20

18

30a

30b

12

16

32

24

38

36
12

14/20
18
22

16

32

24

28

26

34

COMPACT COFFEE PRESS

FIELD OF THE INVENTION

The invention relates to a compact coffee press device comprising plunger member, a soft, flexible diaphragm, and a receptacle member comprising an outlet, wherein the diaphragm is reversibly displaceable between a first position where the plunger member is elevated above the diaphragm, and a second position where the plunger member is depressed and the diaphragm is inverted, the plunger member fitting substantially within the diaphragm, and the diaphragm fitting substantially within the receptacle member. The invention further relates to a method of brewing and extracting coffee with the use of the coffee press.

BACKGROUND

The coffee drinker market is moving away from instant powder coffees and is moving to freshly grounded beans brewed in a French press (plunger), V60 pour over device, moka pot (stovetop espresso maker), or using an espresso machine. These methods however take a lot of effort to prepare the coffee for drinking, and can be somewhat "messy" or expensive. Large automated coffee machines are very expensive, need to be maintained, require constant cleaning and are impossible to travel with.

The AeroPress® coffee maker (and similar coffee makers based on this design) have been the gold standard for portable manual force extraction coffee making for many years. However, there are challenges associated with this type of design, as there are many loose parts that need to be cleaned and get lost, particularly when travelling. These portable coffee makers are in fact also fairly bulky, and due to their multiple-part design are not ideal for travelling. The updated model that was optimised for traveling and camping, as well as use in the office or at home, the AeroPress Go®, has been criticised as merely being a smaller version of the AeroPress®, which does not provide enough volume of coffee to fill a cup, and still comprises the multiple component parts making the product difficult to clean and prone to loss of the parts, particularly during travel. The portable manual force extraction coffee makers presently on the market are also prohibitively expensive for coffee drinking consumers.

It would be useful for a new device to be developed having a design in which such known problems are addressed. Such a product would be aimed at persons that need a quick "high quality" cup of coffee for hiking, travelling or in the office as well as at home, without much effort or mess. Preferably the product should be compact with relatively few parts, to ensure ease while travelling, without neglecting the quality of the coffee produced.

SUMMARY OF THE INVENTION

According to a first embodiment of the invention there is provided a compact coffee press device comprising:
   a) a substantially rigid frustoconical plunger member tapering towards a base;
   b) a soft, flexible diaphragm located below, and integrally formed with, connected or connectable to, the base of the plunger member, the diaphragm comprising frustoconical side walls, widening from a top portion of the diaphragm closest to the base of the plunger member and having a diameter substantially the same as the base of the plunger member, towards a base portion; and
   c) a substantially rigid, frustoconical receptacle member connected or connectable to the base portion of the diaphragm, the receptacle member tapering from the end connected or connectable to the base of the diaphragm to a base portion defining an aperture, the base portion sized to rest on or within, or be supported by a coffee receptacle,
wherein the diaphragm is reversibly displaceable between a first position where the plunger member is elevated above the diaphragm, and a second position where the plunger member is depressed and the diaphragm is inverted, the plunger member fitting substantially within the inverted frustoconical side walls of the diaphragm, and the inverted diaphragm fitting substantially within the frustoconical receptacle member, and
wherein the aperture of the base portion of the frustoconical receptacle comprises, connects or is releasably connectable to, or defines a filter portion that opens the aperture when released.

The frustoconical side walls of the diaphragm may comprise two or more stepped gradations. For example, the side walls may comprise two, three, four or more stepped gradations. Preferably, the side walls have two stepped gradations.

The diaphragm may be composed of an elastomeric polymer including rubber, silicon, or a thermoplastic elastomer. Typically, the diaphragm is composed of a thermoplastic elastomer.

The connection between the base portion of the diaphragm and the top portion of the frustoconical receptacle member may be a watertight connection, including a screw connection or a clip connection. Preferably the watertight connection comprises a coupling connector member releasably connecting the diaphragm and the frustoconical receptacle member. In one embodiment of the invention, the watertight connection is a semi-permanent or permanent connection. In another embodiment of the invention, the base portion of the diaphragm and the top portion of the frustoconical receptacle member is integrally formed.

The filter portion may comprise a rigid support member operably orientated parallel to the base portion of the frustoconical receptacle member, the support member comprising a plurality of openings. Typically, the support member is operable to hold and/or support a filter for separating solids, including spent coffee grounds, from liquid, including brewed coffee, when in use. Typically the filter is a coffee filter, which is well known in the art.

The connection between the frustoconical receptacle member and the filter portion may be a watertight connection, including a screw connection or a clip connection. Preferably the watertight connection is a screw connection.

The rigid frustoconical plunger member may define a receptacle and may optionally comprise a lid, for example a lid that screws or clips onto an open top end of the frustoconical plunger member. For example, the receptacle may be used for storage of any one or more of coffee grounds, coffee beans, sweetener, powdered milk, a measuring scoop, a stirring device, and the like.

The measuring scoop may comprise a handle for stirring brewed coffee and a measuring receptacle for measuring out the desired quantity of ground coffee for a single cup of coffee.

The frustoconical receptacle member may comprise two or more projections, or a lip extending laterally from the side or base of the receptacle member for resting or supporting of the receptacle member on the open end of a coffee receptacle when in use. For example, there may be two, three, four or more projections.

Any one or more of the rigid frustoconical plunger member, frustoconical receptacle member, coupling connector member and filter portion may be comprised of metal and/or a plastic polymer, including polypropylene, polyvinyl chloride (PVC), styrene, thermoplastic starch, or the like.

According to a second embodiment of the invention, there is provided a method of preparing coffee with the use of the compact coffee press device of the invention, wherein the diaphragm is integrally formed with, or connected to, the base of the plunger member, comprising the steps of:

(i) releasing the filter portion of the compact coffee press device such that the aperture of the base portion is open;

(ii) inverting the compact coffee press device to the first position where the plunger member is elevated above the diaphragm;

(iii) flipping the inverted compact coffee press device such that the open aperture of the base portion faces upwards;

(iv) adding a mixture of at least ground coffee, and hot water to the compact coffee press device through the open aperture of the base portion;

(v) steeping the at least ground coffee and hot water in the frustoconical receptacle member until a desired strength of brewed coffee is obtained;

(vi) re-connecting the filter portion onto the aperture of the base portion;

(vii) flipping the inverted compact coffee press device a second time, such that the filter portion of the base portion of the frustoconical receptor member faces downwards;

(viii) placing the base portion of the frustoconical receptacle member onto the opening of a coffee receptacle;

(ix) depressing the plunger member, thereby to invert the diaphragm to a second position, wherein the frustoconical plunger member is fitted substantially within the inverted frustoconical side walls of the diaphragm, and the inverted diaphragm is fitted substantially within the frustoconical receptacle member, and thereby to force the brewed coffee through the outlet and filter of the base portion of the receptacle member, leaving spent coffee grounds to remain in the frustoconical receptacle member; and (x) optionally adding sweetener, milk, additional water, and/or flavouring if desired to the brewed coffee.

Preferably prior to step vi), i.e. re-connecting the filter portion onto the aperture of the base portion, filter paper is positioned in the filter portion. Typically the filter is a coffee filter, which is well known in the art.

Optionally, during or after step v) steeping the at least coffee grounds and hot water, the mixture may be stirred to mix the coffee brew. For example, the coffee may be stirred with the handle of the measuring scoop.

According to an alternative embodiment of the invention, there is provided a method of preparing coffee with the use of the compact coffee press device of the invention, comprising the steps of:

A) steeping a combination comprising ground coffee and hot water in the frustoconical receptacle member until a desired strength of brewed coffee is obtained;

B) connecting the frustoconical plunger member and diaphragm orientated in a first position, wherein the frustoconical plunger member is elevated above the diaphragm, to the frustoconical receptacle member;

C) placing the frustoconical receptacle member onto the opening of a coffee receptacle;

D) depressing the plunger member, thereby to invert the diaphragm to a second position, wherein the frustoconical plunger member is fits substantially within the inverted frustoconical side walls of the diaphragm, and the inverted diaphragm fits substantially within the frustoconical receptacle member, thereby to force the brewed coffee through the outlet and filter of the base portion of the receptacle member or the connected filter portion into the coffee receptacle, leaving spent coffee grounds to remain in the frustoconical receptacle member; and E) optionally adding sweetener, milk, additional water, and/or flavouring if desired to the brewed coffee.

The alternative embodiment further comprises, prior to step (A), a step of placing a filter on the rigid support member of the filter portion of the outlet of the frustoconical receptacle member. In such a case, the brewed coffee is filtered through the filter prior to entering the coffee receptacle in step (D) above.

Typically the filter is a coffee filter, which is well known in the art.

The method may further comprise steps for cleaning the compact coffee press of the invention if desired, and converting the compact coffee press into a storage configuration, comprising:

I. disconnecting or unscrewing the filter portion, if separate from the outlet of the frustoconical receptacle member;

II. disconnecting the frustoconical plunger member and diaphragm from the frustoconical receptacle member;

III. pressing upward on the base of the diaphragm and frustoconical plunger member, thereby to displace the inverted diaphragm back to the first position where the frustoconical plunger member is elevated above the diaphragm;

IV. removing the spent coffee grounds from the frustoconical receptacle member and optionally cleaning the frustoconical plunger member and diaphragm, frustoconical receptacle member, connector member and filter portion;

V. if necessary, reconnecting the frustoconical plunger member and diaphragm to the frustoconical receptacle member and reconnecting the frustoconical receptacle member to the filter portion, if separate from the outlet of the frustoconical receptacle member, displacing the frustoconical plunger member and inverting the diaphragm into the second position, where the frustoconical plunger member fits substantially within the inverted diaphragm frustoconical side walls, and the inverted diaphragm fits substantially within the frustoconical receptacle member, and optionally securing the lid of the conical plunger member.

The reversible displacement of the frustoconical plunger member and diaphragm between the first and second, inverted position and back may generate a distinctive 'popping' sound.

According to a further embodiment of the invention, there is provided a compact coffee press device substantially as described and illustrated in any one of the drawings below.

DETAILED DESCRIPTION

The relates to a compact coffee press device comprising plunger member, a soft, flexible diaphragm, and a receptacle member comprising an outlet, wherein the diaphragm is reversibly displaceable between a first position where the plunger member is elevated above the diaphragm, and a second position where the plunger member is depressed and the diaphragm is inverted, the plunger member fitting substantially within the diaphragm, and the diaphragm fitting substantially within the receptacle member. The invention further relates to a method of brewing and extracting coffee with the use of the coffee press.

Figure 1:
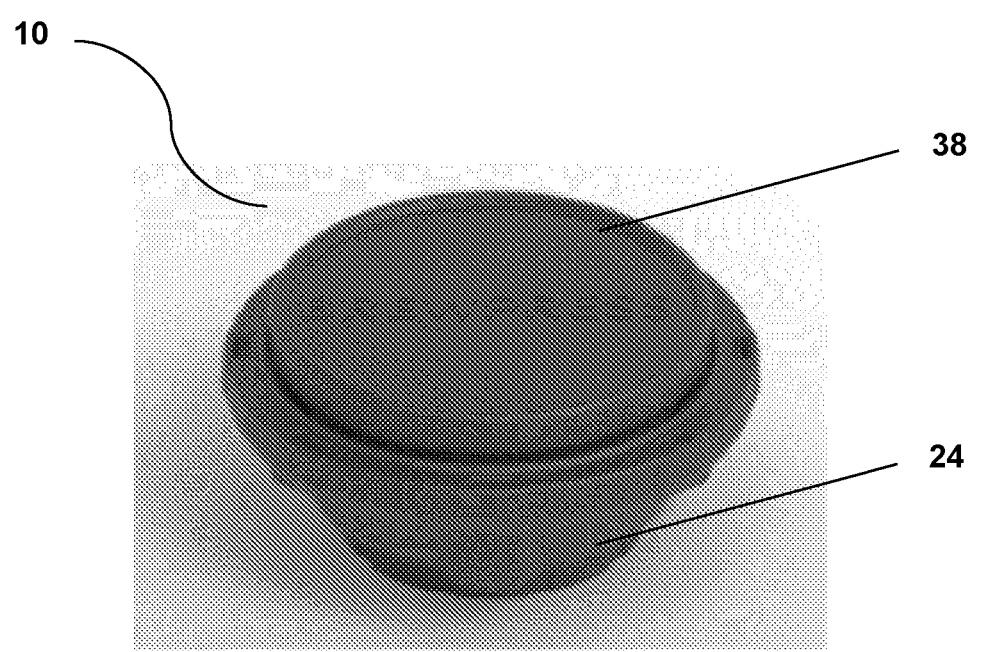
FIG. 1 shows a perspective view of the compact coffee press device of the invention in a storage, or closed first position configuration.
Figure 2:
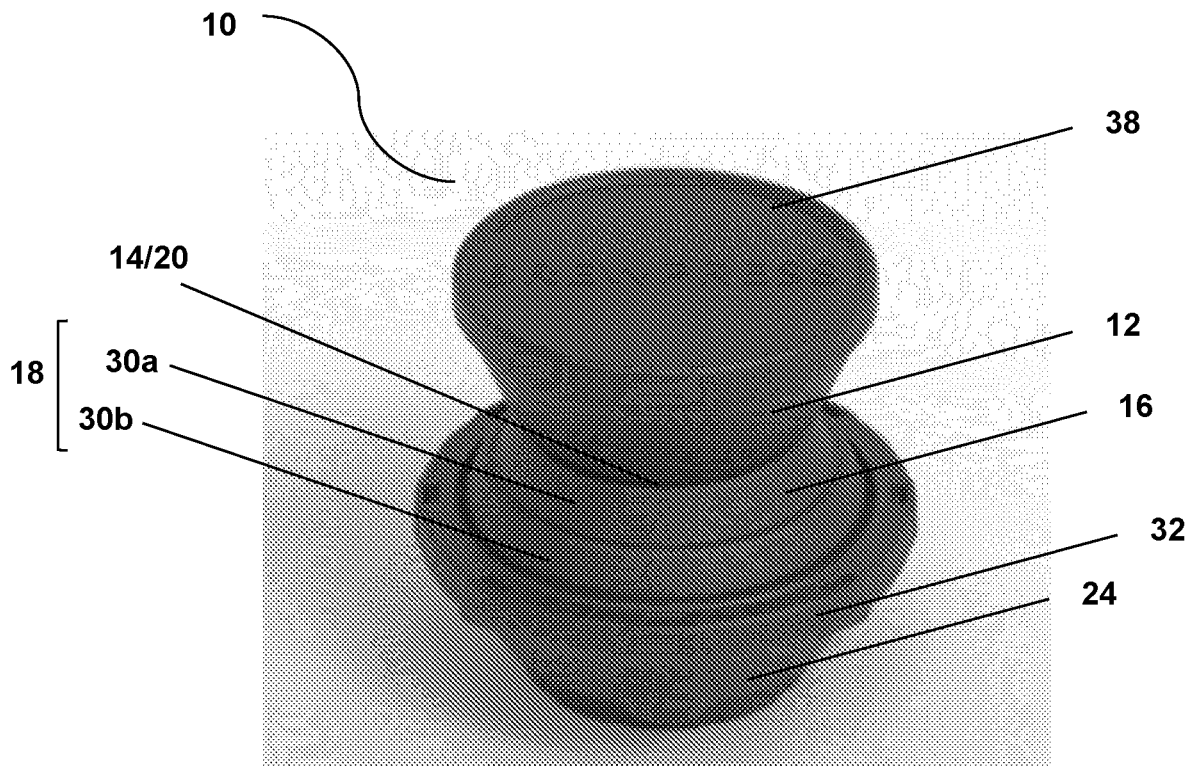
FIG. 2 shows a perspective view of the compact coffee press device of the invention in an open, or second position configuration.
Figure 3:
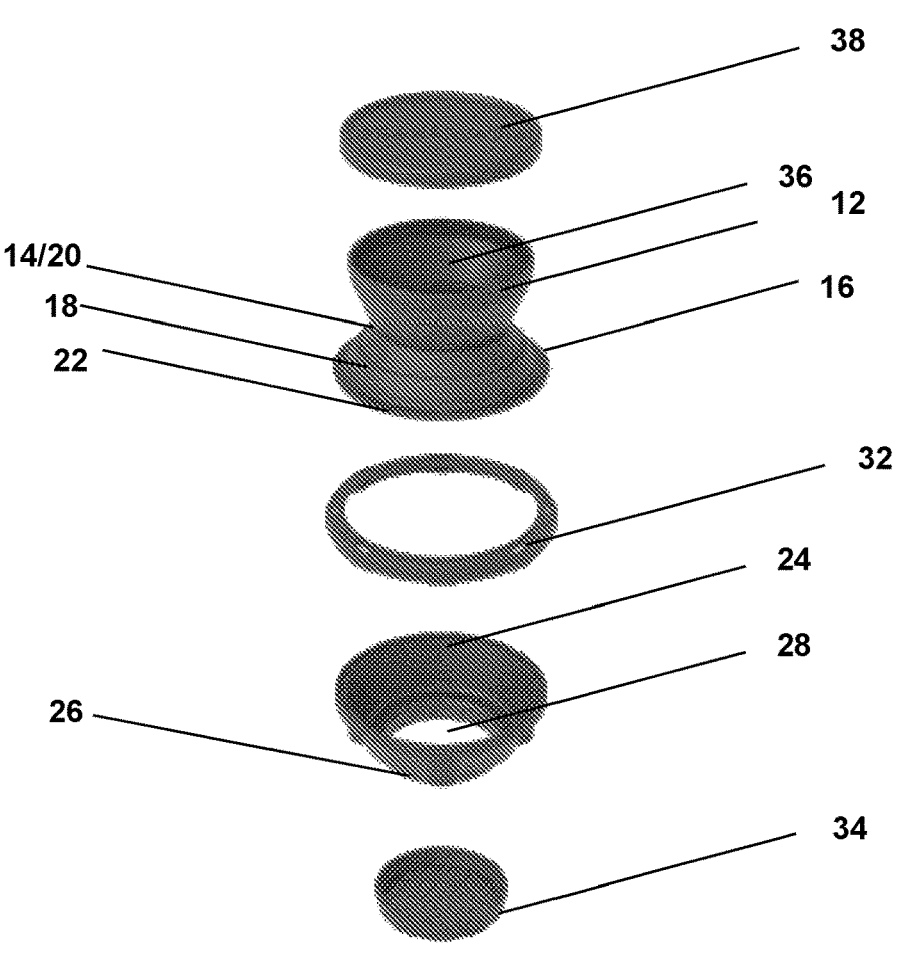
FIG. 3 shows an exploded perspective view of the compact coffee press device of the invention.
Figure 4:
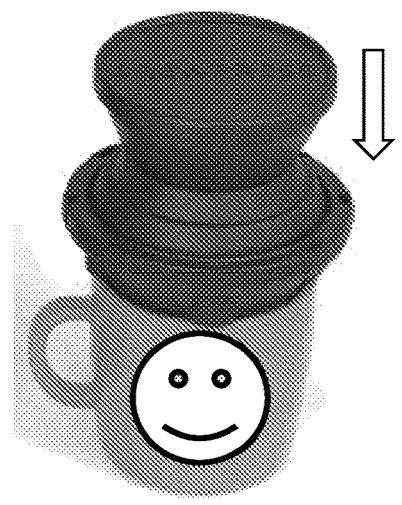
FIG. 4 shows a perspective view of the compact coffee press device of the invention in the second position configuration on top of a coffee cup.

When not in use, the depressed plunger member and diaphragm in the second, inverted position produces a compact coffee press device for camping, hiking and travelling as illustrated in FIG. 1 below.

The technical effect created by the substantially rigid frustoconical plunger member fitting substantially within the diaphragm, and the diaphragm fitting substantially within the substantially rigid frustoconical receptacle member when in the depressed second position, is that the frustoconical plunger member is able to push the flexible diaphragm into its inverted position in a stable and uniform way thereby ensuring that all of the liquid from the coffee brewed in the receptacle member is efficiently expelled through the outlet and filter of the base portion of the receptacle member into the cup.

The applicant has found through iterative experimentation that if there is no substantially rigid frustoconical plunger member and only a flexible frustoconical diaphragm that is depressed using the fingers of a user from a first, upright position into a second, inverted position such that the diaphragm fits within the substantially rigid frustoconical receptacle member in order to expel the liquid from the coffee brewed in the receptacle member through the outlet and filter of the base portion of the receptacle member into the cup, not all of the liquid is effectively expelled due to the uneven force that is applied by a user's fingers.

The action of depressing and extending the plunger member and diaphragm into the first and second positions creates a characteristic and satisfying 'popping' sound. The coffee press device is lightweight, compact, convenient for travel or use outdoors as well as indoors, including at home or at work. It is easy to use and simple and easy to clean. The coffee press device of the invention yields sufficient coffee for one person, which can be diluted if desired by addition of additional milk or hot water.

The following is a description of preferred embodiments of the present invention, given by way of example only, with reference to the accompanying illustrative drawings, FIGS. 1 to 4.

Referring to FIGS. 1 to 4, the compact coffee press device 10 comprises:

(i) a substantially rigid frustoconical plunger member 12 tapering towards a base 14;

(ii) a soft, flexible diaphragm 16 located below the base 14 of the plunger member 12, the diaphragm 16 comprising frustoconical side walls 18, widening from a top portion 20 of the diaphragm 16 closest to the base 14 of the plunger member 12 and having a diameter substantially the same as the base of the plunger member, towards a base portion 22; and (iii) a substantially rigid, frustoconical receptacle member 24 connected or connectable to the base portion 22 of the diaphragm 16, the receptacle member 24 tapering from the end connected or connectable to the base 22 of the diaphragm 16 to a base portion 26 defining an aperture 28, the base portion 26 sized to rest on or within, or be supported by a coffee receptacle, wherein the diaphragm 16 is reversibly displaceable between a first position and a second position where the plunger member 12 is depressed and the diaphragm 16 is inverted, the plunger member 12 fitting substantially within the inverted frustoconical side walls 18 of the inverted diaphragm 16, and the inverted diaphragm 16 fitting substantially within the frustoconical receptacle member 24, and wherein the aperture 28 of the base portion 26 of the frustoconical receptacle member 24 comprises, connects or is releasably connectable to, or defines a filter portion 34 that opens the aperture 28 when released.

In a preferred embodiment, the frustoconical side walls 18 of the diaphragm 16 comprise two stepped gradations 30$a$ and 30$b$.

In the preferred embodiment, the diaphragm is composed of a thermoplastic elastomer.

The connection between the base portion 22 of the diaphragm 16 and the top portion of the frustoconical receptacle member 24 is a clip connection, although it is to be appreciated that a watertight screw connection could also be used. A coupling connector member 32 connects the base portion 22 of the diaphragm 16 and the top of the frustoconical receptacle member 24. In one embodiment of the invention, the watertight connection is a semi-permanent or permanent connection. In another embodiment of the invention, the base portion 22 of the diaphragm 16 and the top portion of the frustoconical receptacle member 24 is integrally formed.

The base portion 26 of the frustoconical receptacle member 24 releasably connects to a filter portion 34 having a rigid support member operably orientated parallel to the base portion 26 of the frustoconical receptacle member 24, the support member comprising a plurality of openings. The support member is operable to hold and/or support a filter for separating solids, including spent coffee grounds, from liquid, including brewed coffee, when in use. Typically the filter is a coffee filter, which is well known in the art.

The connection between the frustoconical receptacle member base 26 and the filter portion 34 is a watertight screw connection.

The rigid frustoconical plunger member 12 may define a receptacle 36 and may optionally comprise a lid 38 that clips onto the open top end of the frustoconical plunger member 12. The receptacle can be used for storage of any one or more of coffee grounds, coffee beans, sweetener, powdered milk, a measuring scoop, a stirring device, and the like.

The measuring scoop comprises a handle for stirring brewed coffee and a measuring receptacle for measuring out the desired quantity of ground coffee for a single cup of coffee.

In a preferred embodiment of the invention, the frustoconical receptacle member 24 comprises four equally spaced projections extending laterally from the base portion 26 for resting or supporting of the receptacle member 24 on a coffee receptacle when in use.

The rigid frustoconical plunger member, frustoconical receptacle member, coupling connector member and filter portion are, in a preferred embodiment of the invention, comprised of polypropylene. However, it is to be appreciated that other materials including metal and/or a plastic polymers such as polyvinyl chloride (PVC), styrene, thermoplastic starch, or the like could be used.

One example of a possible coffee making procedure includes:

1: Inverting the device 10 and adding 18 g of ground coffee to the chamber of the frustoconical receptacle member 24 though the aperture 28 in the base portion 26;

2: Slowly pouring 100 ml of hot water into the chamber of the frustoconical receptacle member 24, ensuring all the water comes into contact with coffee;

3: Allowing the coffee to "bloom" for about 30 seconds then optionally adding additional hot water to fill the chamber;

4: Gently agitating the top layer of the coffee crema, and stirring with the handle of the measuring scoop for a further 10 seconds;

5: Placing a standard sized filter paper onto the filter portion 34 and optionally rinsing the filter paper with hot water, before connecting the filter portion 34 to the base portion 26 of the frustoconical receptacle member 24;

6: Brewing the coffee for another 60 to 90 seconds;

7: Turning the device 10 right side up, and quickly placing the base portion 26 of the frustoconical receptacle member 24 onto a coffee receptacle and depressing the plunger member 12 down fully for 10 to 15 seconds in the direction of the arrow shown in FIG. 4, thereby inverting the diaphragm 16 such that the plunger member 12 and inverted diaphragm 16 fit within the receptacle member 24 and the brewed coffee is extracted through the filter portion 34 and into the coffee receptacle; and 8: optionally adding milk, sweetener, additional hot water, flavouring etc. if desired.

A preferred method of cleaning the compact coffee press 10 of the invention and converting the compact coffee press 10 into a storage configuration, comprises:

(A) disconnecting or unscrewing the filter portion 34 from the base 26 of the frustoconical receptacle member 24;

(B) pressing upward on the base of the diaphragm 16 and frustoconical plunger member 12, thereby to displace the diaphragm 16 back to the first position where the frustoconical plunger member 12 is elevated above the diaphragm 16;

(C) removing the spent coffee grounds from the frustoconical receptacle member 24 and cleaning the frustoconical plunger member 12 and diaphragm 16, frustoconical receptacle member 24, connector member 32 and filter portion 34; and (D) reconnecting the base 26 of the frustoconical receptacle member 24 with the filter portion 34, and displacing the frustoconical plunger member 12 and diaphragm 16 into the second inverted position, where the frustoconical plunger member 12 fits substantially within the diaphragm frustoconical side walls 18, and the inverted diaphragm 16 fits substantially within the frustoconical receptacle member 24, and securing the lid 38 of the conical plunger member 12.

The reversible displacement of the frustoconical plunger member 12 and diaphragm 16 between the first and second positions and back again generates a distinctive 'popping' sound.

It will be understood that various embodiments of the method of the invention are possible without departing from the scope hereof.

The invention claimed is:

1. A compact coffee press device comprising:
   a) a substantially rigid frustoconical plunger member tapering towards a base;
   b) a soft, flexible diaphragm located below, and integrally formed with, connected or connectable to, the base of the plunger member, the diaphragm comprising frustoconical side walls, widening from a top portion of the diaphragm closest to the base of the plunger member and having a diameter substantially the same as the base of the plunger member, towards a base portion; and
   c) a substantially rigid, frustoconical receptacle member connected or connectable to the base portion of the diaphragm, the receptacle member tapering from the end connected or connectable to the base of the diaphragm to a base portion defining an aperture, the base portion sized to rest on or within, or be supported by a coffee receptacle, wherein the diaphragm is reversibly displaceable between a first position where the plunger member is elevated above the diaphragm, and a second position where the plunger member is depressed and the diaphragm is inverted, the plunger member fitting substantially within the inverted frustoconical side walls of the diaphragm, and the inverted diaphragm fitting substantially within the frustoconical receptacle member, and wherein the aperture of the base portion of the frustoconical receptacle comprises, connects or is releasably connectable to, or defines a filter portion that opens the aperture when released.

2. The compact coffee press device according to claim 1, wherein the frustoconical side walls of the diaphragm comprise two or more stepped gradations, including two, three, four or more stepped gradations.

3. The compact coffee press device according to claim 1, wherein the diaphragm is composed of an elastomeric polymer including rubber, silicon, or a thermoplastic elastomer.

4. The compact coffee press device according to claim 1, wherein the connection between the base portion of the diaphragm and the top portion of the frustoconical receptacle member is a watertight connection, including a screw connection or a clip connection.

5. The compact coffee press device according to claim 4, wherein the watertight connection comprises a coupling connector member releasably connecting the diaphragm and the frustoconical receptacle member, wherein the watertight connection is optionally a semi-permanent or permanent connection.

6. The compact coffee press device according to claim 4, wherein the base portion of the diaphragm and the top portion of the frustoconical receptacle member is integrally formed.

7. The compact coffee press device according to claim 1, wherein the filter portion comprises a rigid support member operably orientated parallel to the base portion of the frustoconical receptacle member, the support member comprising a plurality of openings.

8. The compact coffee press device according to claim 7, wherein the support member is operable to hold and/or support a filter, including a coffee filter, for separating solids, including spent coffee grounds, from liquid, including brewed coffee, when in use.

9. The compact coffee press device according to claim 1, wherein the connection between the frustoconical receptacle member and the filter portion is a watertight connection, including a screw connection or a clip connection.

10. The compact coffee press device according to claim 1, wherein the rigid frustoconical plunger member defines a receptacle and optionally comprises a lid, including a lid that screws or clips onto an open top end of the frustoconical plunger member.

11. The compact coffee press device according to claim 10, wherein the measuring scoop comprises a handle for stirring brewed coffee and a measuring receptacle for measuring out the desired quantity of ground coffee for a single cup of coffee.

12. The compact coffee press device according to claim 1, wherein the frustoconical receptacle member comprises two or more projections, including two, three, four or more projections, or a lip extending laterally from the side or base of the receptacle member for resting or supporting of the receptacle member on the open end of a coffee receptacle when in use.

13. The compact coffee press device according to claim 1, wherein any one or more of the rigid frustoconical plunger member, frustoconical receptacle member, coupling connector member and filter portion are comprised of metal or a plastic polymer or a combination thereof, the plastic polymer including polypropylene, polyvinyl chloride (PVC), styrene, or thermoplastic starch.

14. A method of preparing coffee with the use of the compact coffee press device according to claim 1, wherein the diaphragm is integrally formed with, or connected to, the base of the plunger member, comprising the steps of:

(i) releasing the filter portion of the compact coffee press device such that the aperture of the base portion is open;

(ii) inverting the compact coffee press device to the first position where the plunger member is elevated above the diaphragm;

(iii) flipping the inverted compact coffee press device such that the open aperture of the base portion faces upwards;

(iv) adding a mixture of at least ground coffee, and hot water to the compact coffee press device through the open aperture of the base portion;

(v) steeping the at least ground coffee and hot water in the frustoconical receptacle member until a desired strength of brewed coffee is obtained;

(vi) re-connecting the filter portion onto the aperture of the base portion;

(vii) flipping the inverted compact coffee press device a second time, such that the filter portion of the base portion of the frustoconical receptor member faces downwards;

(viii) placing the base portion of the frustoconical receptacle member onto the opening of a coffee receptacle;

(ix) depressing the plunger member, thereby to invert the diaphragm to a second position, wherein the frustoconical plunger member is fitted substantially within the inverted frustoconical side walls of the diaphragm, and the inverted diaphragm is fitted substantially within the frustoconical receptacle member, and thereby to force the brewed coffee through the outlet and filter of the base portion of the receptacle member, leaving spent coffee grounds to remain in the frustoconical receptacle member; and (x) optionally adding sweetener, milk, additional water, and/or flavouring if desired to the brewed coffee.

15. The method according to claim 14, wherein prior to step vi), i.e. re-connecting the filter portion onto the aperture of the base portion, filter paper, including a coffee filter is positioned in the filter portion.

16. The method according to claim 14, wherein during or after step v), i.e. steeping the at least coffee grounds and hot water, the mixture is stirred to mix the coffee brew, with the handle of the measuring scoop contained within the receptacle.

17. A method of preparing coffee with the use of the compact coffee press device according to claim 1, comprising the steps of:

A) steeping a combination comprising ground coffee and hot water in the frustoconical receptacle member until a desired strength of brewed coffee is obtained;

B) connecting the frustoconical plunger member and diaphragm orientated in a first position, wherein the frustoconical plunger member is elevated above the diaphragm, to the frustoconical receptacle member;

C) placing the frustoconical receptacle member onto the opening of a coffee receptacle;

D) depressing the plunger member, thereby to invert the diaphragm to a second position, wherein the frustoconical plunger member is fits substantially within the inverted frustoconical side walls of the diaphragm, and the inverted diaphragm fits substantially within the frustoconical receptacle member, thereby to force the brewed coffee through the outlet and filter of the base portion of the receptacle member or the connected filter portion into the coffee receptacle, leaving spent coffee grounds to remain in the frustoconical receptacle member; and E) optionally adding sweetener, milk, additional water, and/or flavouring if desired to the brewed coffee.

18. The method according to claim 17, which further comprises, prior to step (A), a step of placing a filter, including a coffee filter, on the rigid support member of the filter portion of the outlet of the frustoconical receptacle member such that the brewed coffee is filtered through the filter prior to entering the coffee receptacle in step (D) above.

19. The method according to claim 14, further comprising steps for cleaning the compact coffee press of the invention, and converting the compact coffee press into a storage configuration, comprising:

I. disconnecting or unscrewing the filter portion, if separate from the outlet of the frustoconical receptacle member;

II. disconnecting the frustoconical plunger member and diaphragm from the frustoconical receptacle member;

III pressing upward on the base of the diaphragm and frustoconical plunger member, thereby to displace the inverted diaphragm back to the first position where the frustoconical plunger member is elevated above the diaphragm;

IV. removing the spent coffee grounds from the frustoconical receptacle member and optionally cleaning the frustoconical plunger member and diaphragm, frustoconical receptacle member, connector member and filter portion;

V. if necessary, reconnecting the frustoconical plunger member and diaphragm to the frustoconical receptacle member and reconnecting the frustoconical receptacle member to the filter portion, if separate from the outlet of the frustoconical receptacle member, displacing the frustoconical plunger member and inverting the diaphragm into the second position, where the frustoconical plunger member fits substantially within the inverted diaphragm frustoconical side walls, and the inverted diaphragm fits substantially within the frustoconical receptacle member, and optionally securing the lid of the conical plunger member.

\* \* \* \* \*